Aug. 21, 1962   J. EBERHARDT   3,049,759
INJECTING MOULDING APPARATUS
Filed Feb. 18, 1959   2 Sheets-Sheet 1

INVENTOR.
Joseph Eberhardt
BY Richard J. Myers
and
John J. Kowalik
Atty.

Aug. 21, 1962  J. EBERHARDT  3,049,759
INJECTING MOULDING APPARATUS
Filed Feb. 18, 1959  2 Sheets-Sheet 2
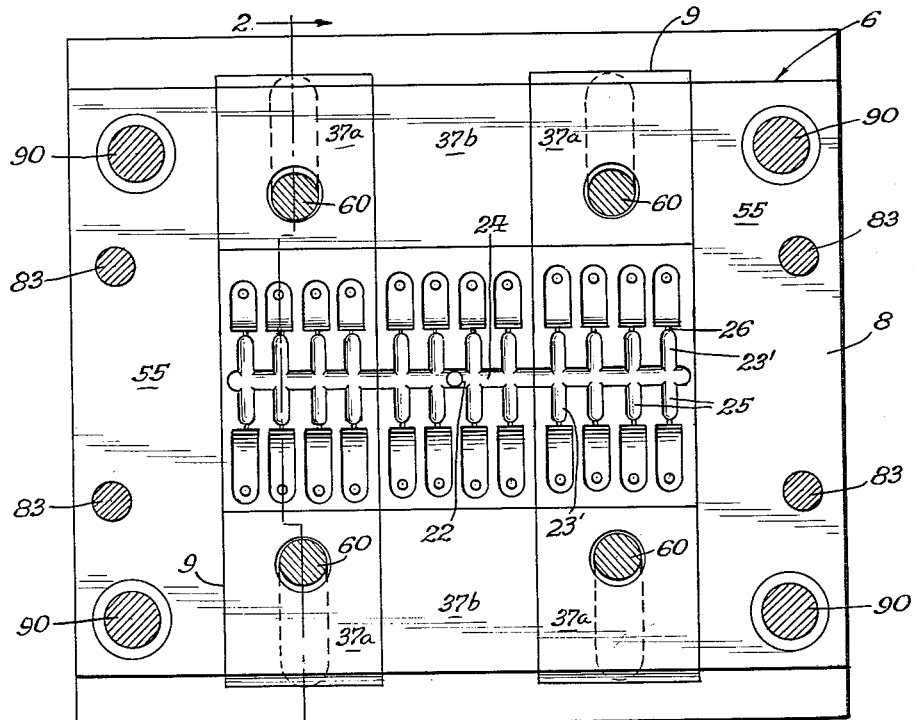
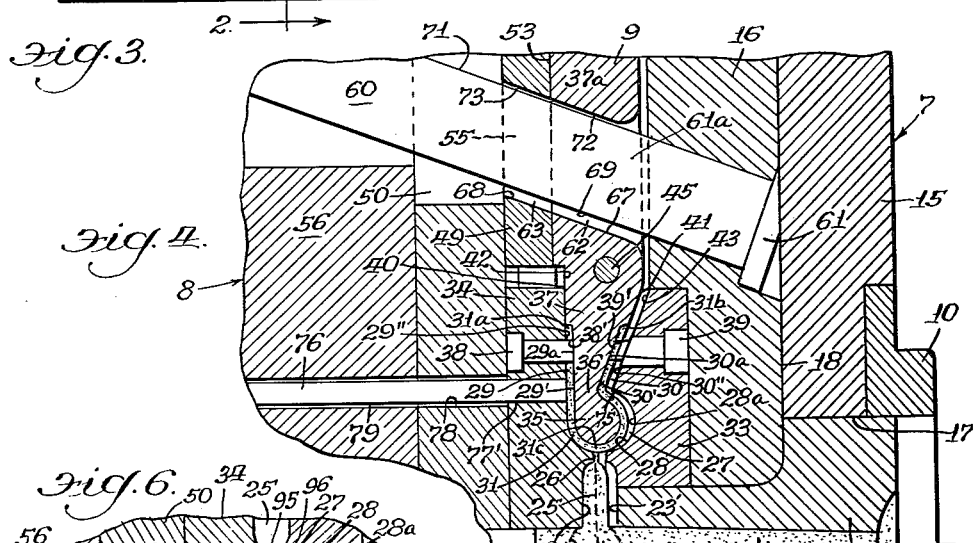
INVENTOR.
Joseph Eberhardt
BY Richard J. Myers
and John J. Kowalik
Attys United States Patent Office
3,049,759
Patented Aug. 21, 1962

3,049,759
INJECTING MOULDING APPARATUS
Joseph Eberhardt, 2860 N. Broadway Ave., Chicago, Ill.
Filed Feb. 18, 1959, Ser. No. 794,087
5 Claims. (Cl. 18—42)

This invention relates to injection moulding apparatus and more specifically to a type which is self-ejecting.

One of the problems occurring in this art is that invariably the product is difficult to extricate from the mold and so that this task must be tediously manually performed. This is not only hazardous to the operator, but is time consuming and expensive. Furthermore, there is always the probability of damage to the expensive dies as the operator pries the castings loose.

A general object of the invention is to devise a novel self-ejecting die of simple and economical construction in which the die parts cooperate to effect stripping of the cast product.

A further object of the invention is to devise a novel die mechanism comprising a stationary part and a complementary movable part and an intervening core and in which the core is carried on the movable part and moved transversely of the movement of the movable part for withdrawing it from the interior of the product attendant to the separation of the movable die parts so that the article or casting is freed of the die.

In furtherance of the immediately previous object, I provide a novel guide and actuator element on the stationary die part which engages the core through an opening therein, the said element extending diagonally outwardly from the stationary to the movable die part whereby as the dies separate the core riding on the element withdraws from between the die parts releasing the molded article.

A different object of the invention is to provide a novel ejector mechanism which includes a plurality of push rods stationarily mounted and extending through strategic areas of the movable die and so arranged as to push the article or casting out of the mold cavity upon the core being withdrawn to a point where the article will shed therefrom.

A still further object of the invention is to devise a novel die assembly in which the movement of the core and movable die part is concomitant to strip the article from the stationary die and wherein the separation of the movable and stationary die parts is so arranged that the die parts pinch the article off the core to facilitate withdrawal of the core therefrom.

These and other objects of the invention will become more apparent from the specification and the drawings, wherein:

FIGURE 3 is a transverse vertical sectional view taken substantially on the parting line of the dies and illustrating the ejector portion of the die;

FIGURE 4 is a fragmentary view similar to FIGURE 2 illustrating the initial separation and pinching action of the die parts;

FIGURE 6 is a modified form of the invention illustrating submarine gating to the mold cavities.

Figure 1:
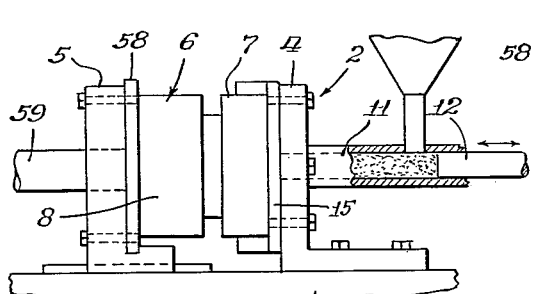
FIGURE 1 is a fragmentary side elevational view of a press with the novel die mounted therein.

Describing the invention in detail there is shown a press generally designated 2 comprising a bed 3 on which are mounted the stationary and movable platens 4 and 5 and between which is interposed the novel mold apparatus or flask generally indicated 6.

The mold 6 comprises mating stationary and movable mating die elements or parts 7 and 8 which for purposes of description may be termed the cope and drag, and an intervening core member 9.

The stationary element 7 and platen 4 comprise a unitary structure and incorporates a locating ring 10 mounted centrally on platen 15 the ring 10 serving as a convenient connection to a tubular cylinder 11 which is charged with heated molten or fluid plastic such as nylon which is forced by a ram 12 through the sprue 13 which is formed in a nozzle 14 mounted centrally on the clamp platen 15 and projects through a retainer platen 16 and through the stationary mold element 7 to which it is connected. It will be seen that the nozzle 14 has an enlarged shoulder 17 which engages the outer side 18 of the retainer platen 16 and the inner side of platen 16 is recessed and admits the element 7.

The retainer platen 16 is mounted between inwardly projecting wedge lock lugs 20 and secured thereto as by screws 21.

The sprue communicates with a longitudinal main passage 22 which is formed by the channel sections 23, 24 in the sections 33 and 34 of die parts 7 and 8 centrally thereof said passage 22 communicating with branch passages 25 which are formed by the channel sections 23', 23' in the sections 33 and 34 of die parts 7 and 8. Each branch 25 communicates through a gate 26, preferably formed at the parting line in die section 34, into a mold cavity 27 at the bight portion 28 thereof said cavity continuing into leg portions 29 and 30 which define the cast article or product which in the present instance is a clamp 31 (FIG. 4).

Indentures 29' and 30' forming the leg portions 29 and 30 are preferably formed in the core member 9 which is interposed between the mating sections 33 and 34 of the die parts 7 and 8 and comprises a bulbous nose part 35 which is necked down at 36 and a body part 37 in which the indentures 29', 30' are made respectively facing, in the clamped position of the parts, the opposed die surfaces 30'' and 29'' on sections 33 and 34 of parts 7 and 8.

It will be noted that section 34 is provided with an aperture forming core pin 38 which contacts surface 29a at the bottom of cavity 29' and that the core pin 39 engages the surface 30a in the bottom of cavity 30'. These form openings 38' and 39' in the legs 31a, 31b of the clamp or casting 31.

The core member 9 is provided outwardly of the cavities or indentures 29', 30' with flat sealing surfaces 40, 41 which mate with complementary surfaces 42, 43 on the sections 33, 34, the surfaces 40, 42 being normal to the direction of movement of the die parts in separation and closure and the surfaces 41, 43 being angled and converging centerwardly with respect to the surfaces 40, 42, the outward divergence of surface 43 affording clearance for the nose portion 35 in the separation of the die as best seen in FIGURE 4.

Figure 5:
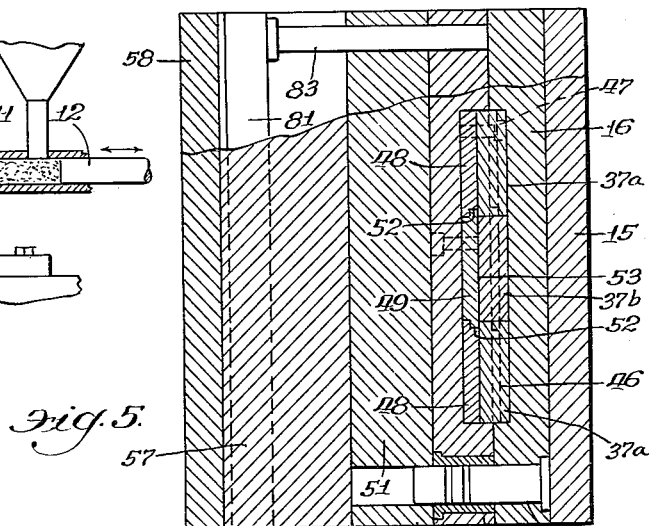
FIGURE 5 is a sectional view of the core and dies and illustrating the core interlocking structure.

The core member 9 has a plate-like mounting and body part extension or slide portion 37a. As best seen in FIGURE 5 the core member is formed of a plurality of end segments 37a, 37a and an intervening segment 37b which are interconnected by dowel pins 45, 46, said sections 37a, being connected as by bolts 47 to plates 48 which flank the way plate 49 mounted and secured upon the retainer plate 50 of the movable die assembly. The plates 48 dovetail with plate 49 as at 52, and plate 49 affords a seat and bearing at 53 for portion 37b.

The plate 50 is connected to die part 8 by the gib structure 55 as well known to those skilled in the art and the gib 55 as well as retainer plate 50 are secured to the backup platen 56 which is connected by parallels 57 to the clamp platen 58 which mounts on the press platen 5 which is actuated by ram 59 to and fro with respect to the stationary parts of the press and die assembly.

The feature of the present invention is in the provision of novel actuating means for moving the core members, these means comprising angle pins or guide and activating pins 60 which are headed at one end 61 and clamped between the clamp platen 15 and retainer platen 16.

In the present instance there are shown four pins 60 two for each core assembly disposed in pairs at opposite sides of the unit in diverging relation toward the movable part. Each pin 60 has a round shank portion 61$^a$ which projects through obround openings 62 and 63 in the slide portions 37$^a$ and plates 49.

Figure 2:
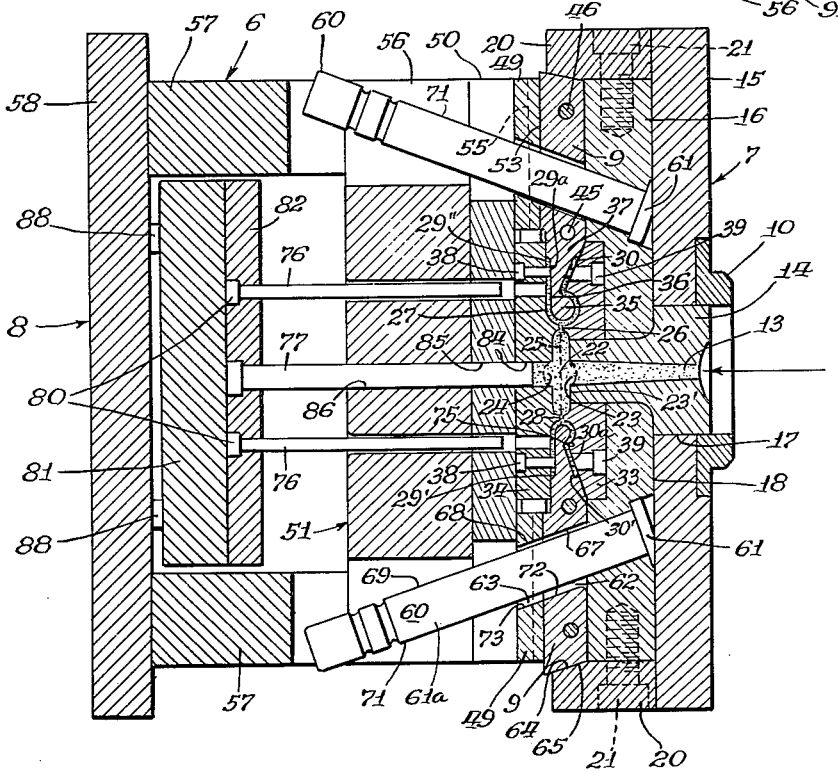
FIGURE 2 is an enlarged longitudinal vertical sectional view of the die assembly taken substantially on line 2—2 of FIGURE 3.

Considering the parts in closed position as in FIGURE 2 it will be seen that the slide portions 37$^a$ of the core members have their wedging faces 64 engaged with complementary wedge faces 65 on the lugs 20. The mold parts are tightly engaged along their parting face, and the faces 40, 41 are wedged between surfaces 42, 43. It will be seen that the inner edges 67 and 68 of openings 62, 63 are disengaged and disposed inwardly of the inner edges 69 of the shank portions 61$^a$ of the pins 60.

After the material is injected into the cavities through the sprue, runners and gates, the press is actuated to separate the die. The movable part is drawn away from the stationary part disengaging the wedge faces 64, 65 and at the same time separating sections or portions 33, 34 as best seen in FIGURE 4. At this stage the leg 31$^b$ of the clamp 31 is stripped off, surface 43 and a part of the bight portion 31$^c$ (FIG. 4) of the clamp is withdrawn from the cavity portion 28$^a$ and at the same time the outside edge 71 of the shank portion 61$^a$ of the pin engages the outer edge 72, 73 (FIG. 4) of the associated openings 62, 63 (FIG. 4). The movement of the die parts and the core are so proportioned that the lip 75 formed at the junction of surfaces 28$^a$, 43 pinches the clamp off the nose part 35 of the core, this stripping action being also assisted by the pin 38 (FIG. 6) which is engaged in aperture 38' in leg 31$^a$ of the clamp 31. As the die parts separate the core parts are moved outwardly completely withdrawing them from clamps.

After the cores are withdrawn sufficiently the ejector pins 76 and the sprue puller pin 77 emerge through the surfaces 29' and 24, said pins 76 extending through suitable apertures 77, 78 and 79 in the section part 33, the retainer plate 50, and backup platen 56 and having headed ends 80 which are clamped between the kick-out platen 81 and the kick-out retainer plate 82 fastened thereto, the platen 81 being carried by supports 83 connected to the stationary platen assembly. The sprue ejector stem or pin 77 extends through apertures 84, 85, and 86 in parts 34, 50 and 56 and is secured to parts 81, 82. Thus the article casting and the interconnecting runners are stripped off the die and drop into an associated receptacle (not shown) therebelow.

The die is closed by extension of the ram 59 moving the movable die parts etc. toward the stationary part. The cores ride on the inner edges 67, against the inner sides 69 of the pins until the surfaces 64, 65 engage which force the cores inwardly engaging and wedging surfaces 40, 42 and 41, 43 while the parting faces 66 engage. The movement of the press may be limited by stop buttons 88 on the platen engaging the kick-out back platen 81.

It will be understood that in the meantime the pins 76 and 77 will have withdrawn to the position shown in FIGURE 2.

The retainer plate 16 clamps a plurality of guide pins 90 to the plate 15, the pins operating in sockets 91 in the plates 50 and 56 to maintain the ejector and stationary parts in alignment.

The embodiment of FIGURE 6 is identical with the structure of FIGURES 1–5 and corresponding numbers are used to identify corresponding parts except for the gate 95 which is below the parting surface 96.

Having described the preferred embodiment of the invention, it is to be understood that various forms of the invention will become readily apparent to those skilled in the art within the scope of the appended claims.

I claim:

1. In an injection molding apparatus for casting an article having a bight portion, the combination of a press having stationary and movable platens, stationary and movable dies mounted thereon respectively, a core slidably interlocked with said movable die for movement transversely of said dies between the same, a guide and activating element mounted on said stationary platen and diverging laterally outwardly of the dies and extending through a diagonal aperture in said core and operative through engagement with the core to move the same as aforesaid, said core having an enlarged portion and at least one of the dies having an encasing cavity receiving said portion therein and terminating in a lip structure overlapping said portion, said enlarged portion and said cavity forming the bight portion therein and said lip structure holding said bight portion upon passage of the enlarged core portion therethrough with concurrent expansion of the article by the enlarged core portion, said aperture in the core being larger than said element to provide lost motion therebetween, and wedge means on the core and said stationary platen engageable in the closed position of the dies to urge and hold said core in operative position with said dies.

2. In an injection molding apparatus for casting an article having a bight portion, the combination of a press having stationary and movable platens, stationary and movable dies mounted thereon respectively, a core slidably interlocked with said movable die for movement transversely of said dies between the same, a guide and activating element mounted on said stationary platen and diverging laterally outwardly of the dies and extending through a diagonal aperture in said core and operative through engagement with the core to move the same as aforesaid, said core having an enlarged portion and at least one of the dies having an encasing cavity receiving said portion therein and terminating in a lip structure overlapping said portion, said enlarged portion and said cavity forming the bight portion therein and said lip structure holding said bight portion upon passage of the enlarged core portion therethrough with concurrent expansion of the article by the enlarged core portion, said aperture in the core being larger than said element to provide lost motion therebetween, and wedge means on the core and said stationary platen engageable in the closed position of the dies to urge and hold said core in operative position with said dies, and said core member having a pair of inwardly converging surfaces and said die members having complementary surfaces in wedging engagement with each other in the closed position of the dies.

3. In an injection molding apparatus for casting an article having a bight portion, the combination of a press having stationary and movable platens, stationary and movable dies mounted thereon respectively, a core slidably interlocked with said movable die for movement transversely of said dies between the same, a guide and activating element mounted on said stationary platen and diverging laterally outwardly of the dies and extending through a diagonal aperture in said core and operative through engagement with the core to move the same as aforesaid, said aperture in the core being larger than said element to provide lost motion therebetween, and wedge means on the core and said stationary platen engageable in the closed position of the dies to urge and hold said core in operative position with said dies, and said core member having a pair of inwardly converging surfaces and said die members having complementary surfaces in wedging engagement with each other in the closed position of the dies, and said core member having an enlarged inner end portion and one of said dies having a lip positionable behind said portion in said closed position of the dies and said dies initially partially separable from the core within the period of lost motion to strip an associated casting from said stationary die, and said lip positionable in pinching relation to said article as said core withdraws from said dies, said lip being in only slightly clearing relation to said enlarged portion of the core.

4. In an injection molding device for making a plastic casting, the combination of a pair of mating dies and an intervening core, said core having an enlargement and at least one of said dies having an encasing cavity receiving said enlargement therein and terminating in a lip structure overlapping said enlargement, a press having platens connected to respective dies for separating the dies laterally of the core at a predetermined rate, a guide and activating element mounted on one of said platens and diverging laterally outwardly of the dies and extending transversely of the core and operative through engagement with the core to move the core for concurrently withdrawing the core from between the dies at a rate such that said core with the casting is moved from between the dies while the lip structure continuously engages the casting and strips it off the enlargement.

5. In an injection molding device for making a plastic casting, the combination of a pair of mating dies and an intervening core, said core having an enlargement and at least one of said dies having an encasing cavity receiving said enlargement therein and overlapping said enlargement, a press connected to respective dies for separating the dies laterally of the core at a predetermined rate, a guide and activating element mounted on the press outwardly of the dies and reacting against the core and operative to move the core for concurrently withdrawing the core from between the dies at a rate such that said core with the casting is moved from between the dies while said one of the dies continuously engages the casting and strips it off the enlargement.

References Cited in the file of this patent
UNITED STATES PATENTS

| | | |
|---|---|---|
| 2,477,368 | Gits | July 26, 1949 |
| 2,571,766 | Saulino | Oct. 16, 1951 |
| 2,688,159 | Swartz et al. | Sept. 7, 1954 |
| 2,834,990 | Seer | May 20, 1958 |